United States Patent
Yeo (10) Patent No.: US 9,444,390 B2
(45) Date of Patent: Sep. 13, 2016

(54) APPARATUS AND METHOD FOR REDUCING COMMON MODE VOLTAGE

(71) Applicant: Hyundai Motor Company, Seoul (KR)

(72) Inventor: Joo Yong Yeo, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,770

(22) Filed: Dec. 3, 2014

(65) Prior Publication Data

US 2015/0357961 A1    Dec. 10, 2015

(30) Foreign Application Priority Data

Jun. 10, 2014    (KR) .................. 10-2014-0069836

(51) Int. Cl.
| H02P 1/28 | (2006.01) |
|---|---|
| H02P 7/06 | (2006.01) |
| H02P 27/00 | (2006.01) |
| H02P 29/00 | (2016.01) |

(52) U.S. Cl.
CPC ........... *H02P 29/00* (2013.01); *H02P 29/0038* (2013.01)

(58) Field of Classification Search
CPC ......... B60W 20/00; B60W 2710/086; B60W 2510/085; B62D 5/046; B60L 2240/549; B60L 11/1811; B60L 15/2009; B60L 7/16; B60L 11/005; B60L 2240/486; B60L 2240/547; B60L 11/00; B60L 11/12; B60L 11/1807; B60L 1/00; B60L 2240/427; B60L 2240/52
See application file for complete search history.

(56) References Cited

U.S. PATENT DOCUMENTS

| 2007/0068727 A1* | 3/2007 | Miura ................... B62D 5/046 180/446 |
|---|---|---|
| 2007/0093359 A1* | 4/2007 | Kobayashi ............... B60K 6/48 477/107 |
| 2011/0198919 A1* | 8/2011 | Hattori ................ B60L 11/1811 307/9.1 |
| 2013/0013154 A1* | 1/2013 | Aoki ..................... B62D 5/046 701/42 |
| 2013/0033914 A1* | 2/2013 | Yahata .................... H02M 7/48 363/132 |

FOREIGN PATENT DOCUMENTS

| JP | 2006-333647 A | 12/2006 |
|---|---|---|
| JP | 2008-154399 A | 7/2008 |
| JP | 2009-254179 A | 10/2009 |
| JP | 2009-290938 A | 12/2009 |
| JP | 2011-172329 A | 9/2011 |
| KR | 10-2007-0022163 A | 2/2007 |

OTHER PUBLICATIONS

Jung, Kibum et al., "Study on the High-Frequency Circuit Modeling of the Conducted-Emission from the Motor Drive System of an Electric Vehicle", The Jrl of Korean Institute of Electromagnetic Engineering and Scient (vol. 24, No. 1, pp. 82-90).

\* cited by examiner

*Primary Examiner* — Marlon Fletcher
(74) *Attorney, Agent, or Firm* — Mintz Levin Cohn Ferris Glovsky and Popeo, P.C.; Peter F. Corless (57) ABSTRACT

An apparatus and a method for that reduce a common mode voltage are provided. The apparatus includes a detecting unit that is configured to detect a common mode voltage between a drive shaft and a frame of a drive motor. In addition, a gate resistance unit of a power module is connected to the drive motor. A controller is configured to adjust a magnitude of resistance of the gate resistance unit, based on a magnitude of the detected common-mode voltage and a magnitude of a predetermined reference voltage.

20 Claims, 7 Drawing Sheets

FIG. 1

RELATED ART

FIG. 2

RELATED ART

Common-mode Voltage(Conventional)

FIG. 8B

APPARATUS AND METHOD FOR REDUCING COMMON MODE VOLTAGE

CROSS REFERENCE TO RELATED APPLICATION

The present application claims priority to Korean Patent Application Number 10-2014-0069836 filed on Jun. 10, 2014, the disclosure of which is incorporated herein in its entirety.

BACKGROUND

1. Field of the Invention

The present invention relates to an apparatus and a method for reducing a common mode voltage. More particularly, the present invention relates to an apparatus and a method that reduces common mode voltage in a drive motor whereby common mode noise attributed to capacitive coupling may be eliminated

2. Description of the Related Art

Hybrid vehicles, electric vehicles, and fuel cell vehicles, also known as green vehicles, commonly utilize an electric motor. Additionally, these vehicles include a high-voltage battery, which is designed to be repetitively charged and discharged during operation of vehicles, to provide power to the electric drive motor, and an inverter that feeds a driving force to the motor from the high-voltage battery, which drives the electric motor. The inverter is also used for regenerative braking (e.g., storing energy back into the battery from the electric drive motor). More particularly, the inverter subjects the high-voltage battery power to phase shift to drive the drive motor, but also acts as a power converter which uses the driving energy from the drive motor and the kinetic energy from regenerative braking to charge the high-voltage battery.

Figure 1:
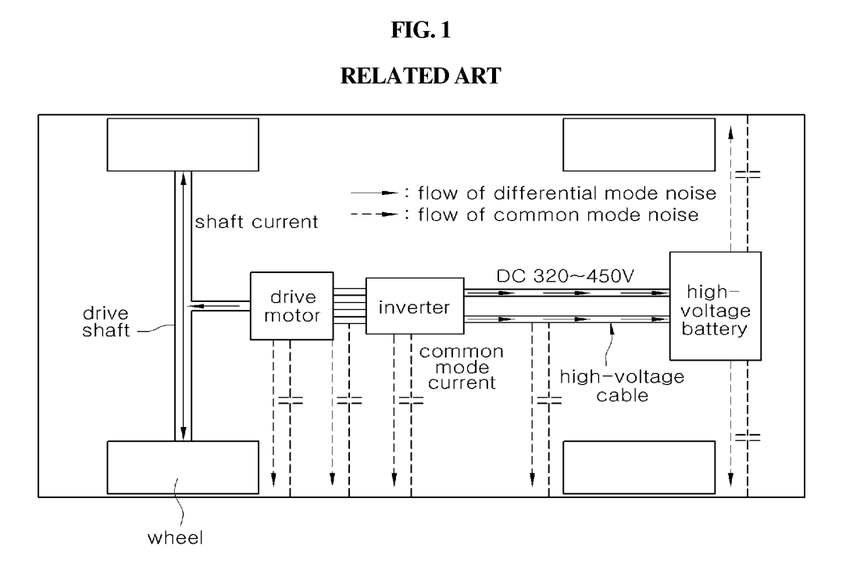
FIG. 1 is an exemplary schematic view illustrating diffusion paths of electromagnetic wave noise in a green car according to the related art.

FIG. 1 is an exemplary schematic view of paths through which electromagnetic wave noise is diffused in green vehicles (e.g., environmentally friendly vehicles). The electromagnetic wave noise includes differential mode noise and common mode nose. When an inverter performs high-voltage and high-frequency switching for power conversion, differential mode noise is delivered (e.g., radiates) across the vehicle via high-voltage cables, drive motors and drive shafts. As for common mode noise, the capacitive coupling, attributed to the parasitic capacitance of high-voltage parts, generates common mode voltages, which induces common mode currents to flow. The common mode noise caused by the common mode voltage diffuses across the vehicle, which causes harmful effects on controllers within the vehicle (e.g., lowering the radio reception performance of the vehicle).

Figure 2:
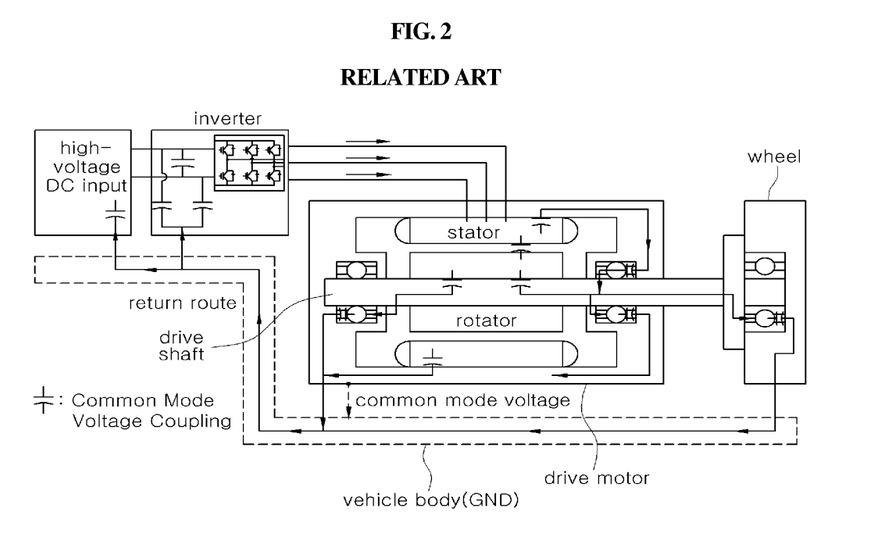
FIG. 2 is an exemplary schematic view illustrating a mechanism by which a common mode voltage is generated in a drive motor, and paths through which common mode noise is transmitted according to the related art.

Further, FIG. 2 is an exemplary schematic view illustrating a mechanism that generates a common mode voltage in an electric drive motor, and the paths through which common mode noise is transmitted. When an inverter performs high-frequency switching for power conversion to generate a driving force for the electric drive motor, a common mode current flows, via a parasitic capacitance present between a stator and a rotor within the motor, between the rotor and a drive shaft, between the stator and a stator winder, between the stator and a motor body, between the motor body and a bearing, and between the bearing and the drive shaft, with the concomitant generation of a common mode voltage. This may be problematic since electromagnetic wave noise may be generated, which has a harmful effect on controllers (e.g., control units) within the vehicle and induces electrical corrosion on motor bearings, which causes noise and poor driving force transmission.

SUMMARY

An objective of the present invention provides an apparatus and a method that may reduce common mode voltage within a drive motor. In accordance with one aspect of the present invention, the apparatus may include a detecting unit configured to detect a common mode voltage between a drive shaft and a frame of a drive motor. The drive shaft may connect a drive motor to wheels there through. In addition, the apparatus may include a gate resistance unit of a power module connected to the drive motor; and a controller configured to adjust a magnitude of resistance of the gate resistance unit based on a magnitude of the detected common-mode voltage and a magnitude of a predetermined reference voltage. The detecting unit and the gate resistance unit may be executed by the controller.

Further, the detecting unit may include a contact unit rests against the drive shaft. The contact unit may include: a brush in direct contact with the drive shaft; and an elastic body configured to press the brush against the drive shaft. The contact unit may also include a thread-like conductor that surrounds the drive shaft. Furthermore, the contact unit may also include a ring-shaped conductor that contacts the drive shaft, and is fixed within a housing. Additionally, the contact unit may comprise a pin-shaped conductor in contact with the drive shaft, and is fixed within a housing.

The apparatus may further include: a filter configured to detect a high-frequency component of the common mode voltage; and a peak detecting unit configured to measure a peak value of the high-frequency component and send the peak value to the controller. The gate resistance unit may include: a first resistance 41, a plurality of second resistances 42 and 43, one or more switching elements 44 and 45 connected respectively to front ends of the plurality of second resistances 42 and 43. The controller may then be configured to receive the measured peak of the common mode voltage with a predetermined reference voltage and adjust ON/OFF states of the switching elements, based on the comparison result. The controller may further be configured to initiate at least one of the switching elements when the peak common mode voltage is greater than the predetermined reference voltage.

Another aspect of the present invention provides a method for reducing a common mode voltage that may include: detecting a common mode voltage between a drive shaft and a drive motor frame; comparing the detected common mode voltage with a predetermined reference voltage; and adjusting a resistance of a gate resistance unit of a power module using one or more switching elements based on the comparison of the detected common mode voltage and the predetermined reference voltage.

The method may further include detecting a high frequency component of the detected common mode voltage; measuring a peak value of the filtered high frequency component; and comparing the measured peak of the high frequency component with the predetermined reference voltage value.

The adjusting process may include decreasing the gate resistance to a lowest degree when the detected common mode voltage is less than the reference voltage. In addition, the adjusting process may further include managing at least one of the switching elements to connect or disconnect at least one of the gate resistances with the drive motor. The comparison process may include comparing the detected common mode voltage with a predetermined first reference voltage; and comparing the detected common mode voltage with a predetermined second reference voltage which is set as being greater than the predetermined first reference voltage, when the detected common mode voltage is greater than the first reference voltage.

The adjusting process may also include increasing the gate resistance to a greatest degree when the detected common mode voltage is greater than the second reference voltage. Additionally, the adjusting process may include turning on at least one of the switching elements when the common mode voltage is less than the reference voltage. Further, the adjusting process may include turning off at least one of the switching elements when the common mode voltage is determined to be greater than the second reference voltage as a result of the comparison with the second reference voltage, said switching elements accounting for connecting/disconnecting at least one resistance of the gate resistance unit with the drive motor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Specific structural or functional descriptions in the exemplary embodiments of the present invention disclosed in the specification or application are only for description of the exemplary embodiments of the present invention. The descriptions can be embodied in various forms and should not be construed as being limited to the exemplary embodiments described in the specification or application.

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or an intervening element(s) may be present there between. In contrast, it should be understood that when an element is referred to as being "directly coupled" or "directly connected" to another element, there are no intervening element(s) present. Other expressions that explain the relationship between elements, such as "between," "directly between," "adjacent to," or "directly adjacent to," should be construed in the same way.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference now should be made to the drawings, in which the same reference numerals are used throughout the different drawings to designate the same or similar components.

Figure 3:
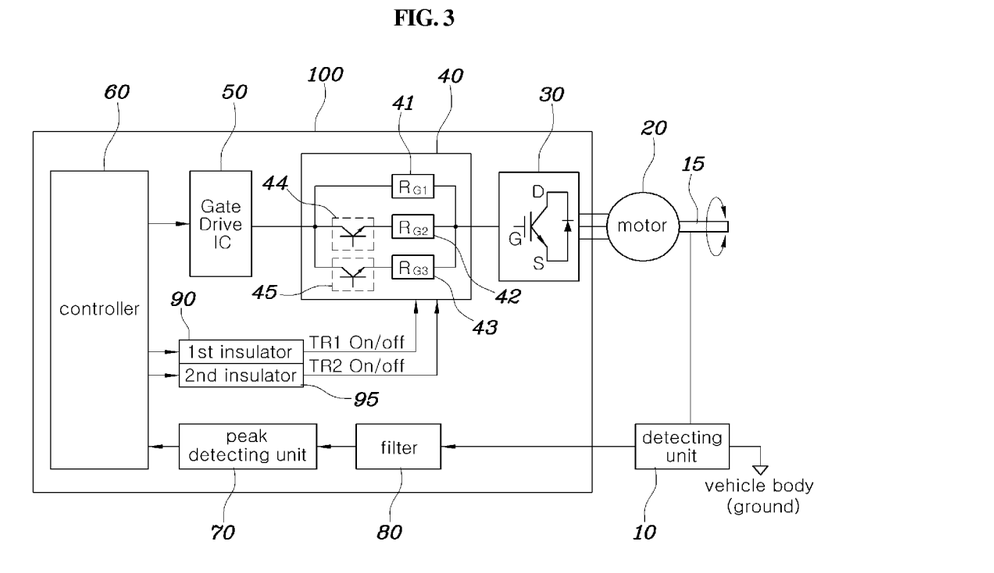
FIG. 3 is an exemplary block diagram of an apparatus configured to reduce common mode voltage according to an exemplary embodiment of the present invention.
Figure 4A:
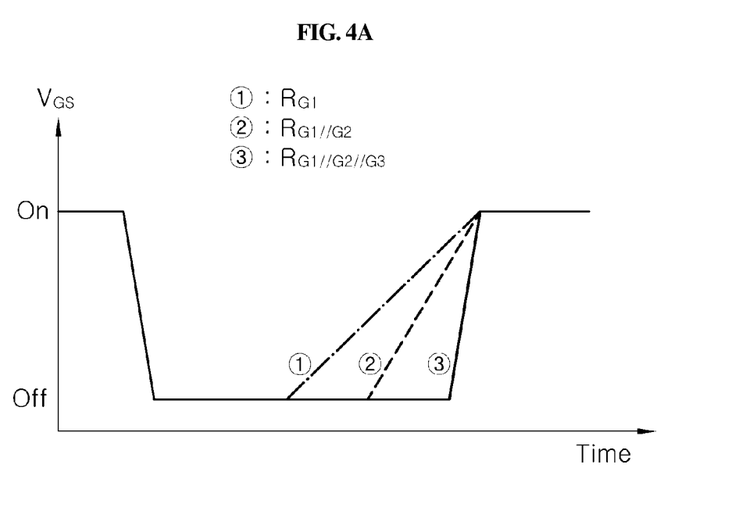
FIGS. 4A and 4B are exemplary plots of gate-source and drain-source voltages as a function of time an apparatus configured to reduce a common-mode voltage according to an exemplary embodiment of the present invention.
Figure 4B:
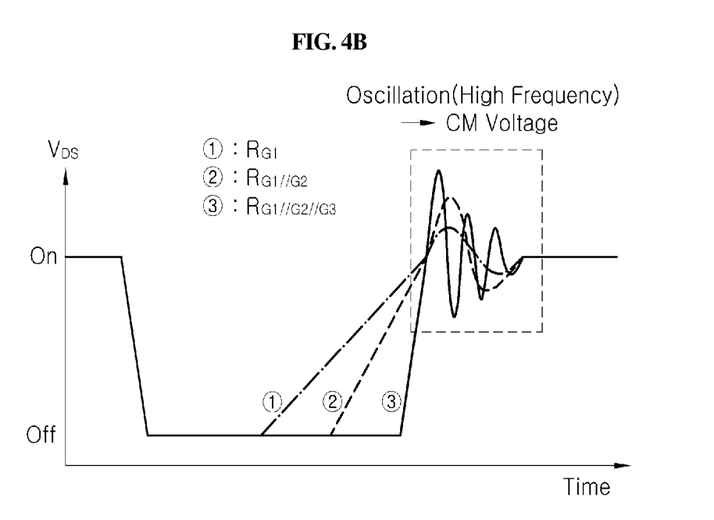
Figure 5:
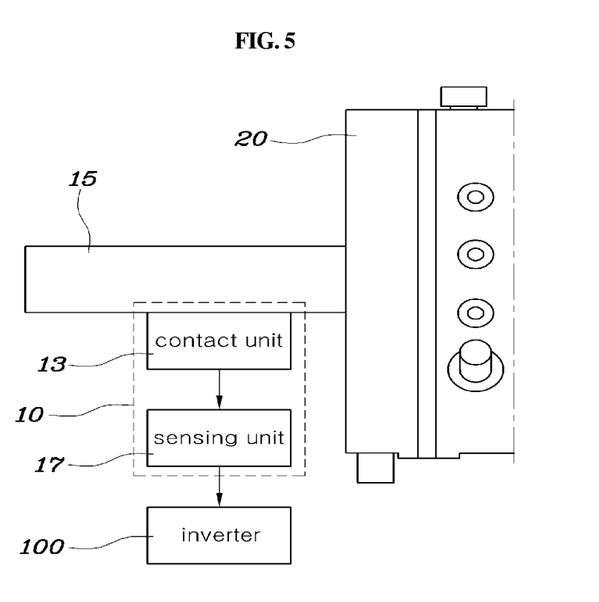
FIG. 5 is an exemplary schematic view of a common-mode voltage detecting unit used in an apparatus configured to reduce a common-mode voltage according to an exemplary embodiment of the present invention.
Figure 6A:
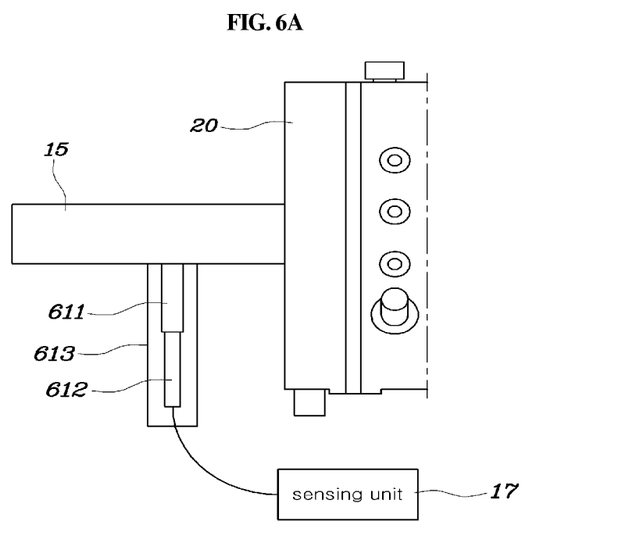
FIGS. 6A to 6C are exemplary views of drive shaft contact units useful in the common mode voltage-detecting unit depicted in FIG. 3 according to an exemplary embodiment of the present invention.
Figure 6B:
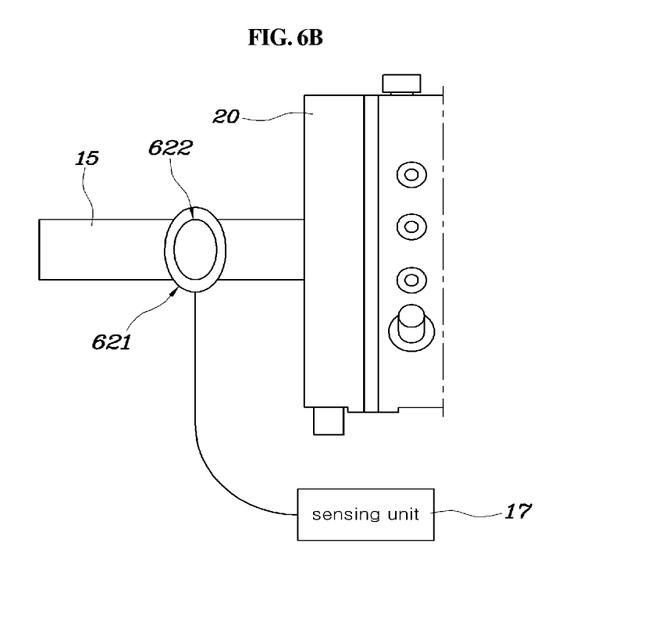
Figure 6C:
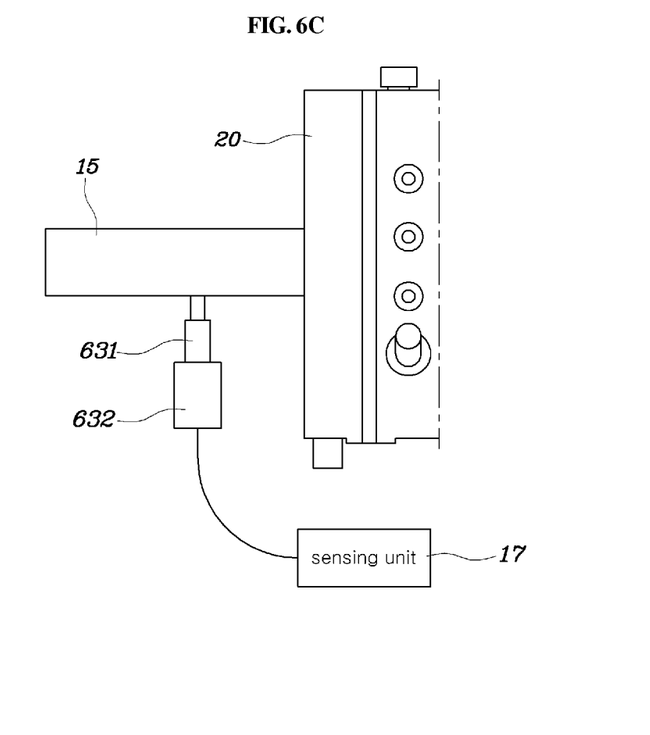

FIG. 3 is an exemplary block diagram of an apparatus configured to reduce a common-mode voltage according to one exemplary embodiment of the present invention. FIGS. 4A and 4B are exemplary graphs in which gate- and drain-source voltages of a power module are, respectively, plotted as a function of time according to an exemplary embodiment of the present invention. FIG. 5 is an exemplary schematic view of a common-mode voltage detecting unit configured to reduce a common-mode voltage according to an exemplary embodiment of the present invention. FIGS. 6A to 6C are exemplary views of drive shaft contact units useful in the common mode voltage-detecting unit depicted in FIG. 3 according to an exemplary embodiment of the present invention.

As shown in FIG. 3, the apparatus configured to reduce a common-mode voltage according to one exemplary embodiment of the present invention may include a detecting unit 10 configured to detect a common-mode voltage between a drive shaft 15 and a frame of a drive motor 20, the drive shaft 15 connects a drive motor 20 to wheels there through; a gate resistance unit 40 of a power module 30 connected to the drive motor 20; and a controller 60 configured to adjust a magnitude of resistances 41, 42 and 43 within the gate resistance unit 40 based on a magnitude of the detected common-mode voltage and a magnitude of a predetermined reference voltage. The controller 60 may be configured to execute the detecting unit 10 and the gate resistance unit 40.

As shown in FIG. 5, the detecting unit 10 may also include a contact unit 13 in contact with the drive shaft 15. As shown in FIG. 6A, the contact unit 13 may include a brush 611 in direct contact with the drive shaft 15, an elastic body 612 configured to press the brush 611 against the drive shaft 15, and a sensor 17 configured to directly detect the common mode voltage. Since the brush 611, which may be composed of graphite or a graphite-containing metal, may be worn out with time (e.g., deteriorate), it may be thrust up by the elastic body 612. Both the brush 611 and the elastic body 612 may be housed within a case 613. The brush 611 and the elastic body 612 may be connected to the sensor 17 using a wire.

Alternatively, according to another exemplary embodiment, the contact unit 13, as shown in FIG. 6B, may include a ring-shaped conductor 621 wrapped around the drive shaft 15, and a housing 622 that surrounds the conductor 621. The drive shaft 15 may include a rotatable rigid body, and may be in contact with a ring-shaped conductor 621 where the conductor 621 winds around the drive shaft 15. Further, the rind-shaped conductor 621 may be made of metal fibers. The conductor 621 may further be connected to the sensor 17 using a wire.

In another exemplary embodiment according to the present invention, the contact unit 13, as shown in FIG. 6C, may include a pin-shaped conductor 631 adjacent to the drive shaft 15, and a housing 632 which the conductor 631 fixed within. The pin-shaped conductor 631 may be substantially thin, similar to a thread. The pin shaped conductor 631 may also be connected to the sensor 17 using a wire.

The gate resistance unit 40 may be a gate terminal resistance of the insulated gate bipolar transistor (IGBT) power module 30, and may include a first resistance 41, a plurality of second resistances 42 and 43, and one or more switching elements 44 and 45 connected respectively to front ends of the plurality of second resistances 42 and 43. The controller 60 may then be configured to adjust an ON/OFF control of the switching elements 44 and 45. Further, the controller 60 may be configured to send a pulse width modulation (PWM) signal to a gate drive circuit 50 and actuate the gate drive circuit 50 to drive the power module 30. Furthermore, the controller 60 may be configured to regulate the resistance magnitude of the gate resistance unit 40 between the gate drive circuit 50 and the gate of the power module 30 by turning on or off the switching elements.

More specifically, the controller 60 may be configured to turn ON/OFF the switching elements 44 and 45 in response to results from a comparison of the peaks of common-mode voltage detected by the detecting unit 10 with a predetermined reference voltage. When the peaks of common-mode voltage are greater than the predetermined reference voltage, the controller 60 may be configured to turn on at least one of the switching elements 44 and 45. In other words, when the common mode voltage peaks exceeds the reference voltage, the controller 60 may be configured to regulate the ON/OFF of the switching elements 44 and 45 to change the parallel connection of the resistances 41, 42, 43 within the gate resistance unit 40 as shown in FIGS. 4A and 4B. Accordingly, the controller 60 may be configured to reduce the common mode voltage by adjusting the slope of voltage to time (e.g., dV/dt). The slope may be feedback controlled to reduce the common mode voltage transmitted to the drive shaft 15, which may result in decreased electromagnetic wave noise and bearing abrasion.

FIG. 4A is an exemplary graph in which gate signals are depicted according to the parallel connection of the gate resistances 41, 42, and 43. The gate signal wave of ① may appear when both the switching elements 44 and 45 are in an OFF state. For ②, one of the switching elements 44 and 45 may be in an ON state while the other may be in an OFF state. When both the switching elements 44 and 45 are in an ON state, the gate signal wave of ③ may be detected.

FIG. 4B is an exemplary graph in which voltage waveforms between a drain and a source in the power module 30 are depicted according to the parallel connection of the gate resistances 41, 42 and 43 according to an exemplary embodiment of the present invention. In FIG. 4B, the drain-source voltage may be represented by ① when both the switching elements 44 and 45 are in an OFF state, ② when one of the switching element 44 and 45 turns on, and the other turns off, and to ③ when both the switching elements 44 and 45 are in an ON state.

As can be seen in FIG. 4A, the slope of the gate signal may be adjusted based on the magnitude of the resistances 41, 42, and 43 of the gate resistance unit 40 by turning on/off the switching elements 44 and 45. Accordingly, voltage oscillations between the drain and the source of the power module 30 may be adjusted to reduce the common-mode voltage, which may result in a decrease in electromagnetic wave noise and bearing abrasion.

In one exemplary embodiment of the present invention, the apparatus may further include: a high-pass filter 80 configured to allow high-frequency signals to pass and attenuate low-frequency signals; a differential circuit (not shown), which may be a pre-treatment circuit unit, configured to emphasize peak signals of the high frequency components of common-mode voltage detected in the high-pass filter 80; and a peak detecting unit 70 configured to detect a peak of the common-mode voltage. When the detected peak values of the common mode voltage are input thereto, the controller 60 may be configured to compare the peak values with a first predetermined reference value (Vref1) and a second predetermined reference value (Vref2) and adjust the gate resistance of the IGBT power module in response to the comparison of the peak values and the predetermined reference values. Further, the present invention is not limited to the organization of the high-pass filter 80, the semi-differential circuit, and the peak detecting unit 70, but may also be implemented in another way. Additionally, the apparatus according to an exemplary embodiment of the present invention may further include insulators 90 and 95 configured to electrically insulate the gate resistance unit 40 from the controller 60.

Figure 7:
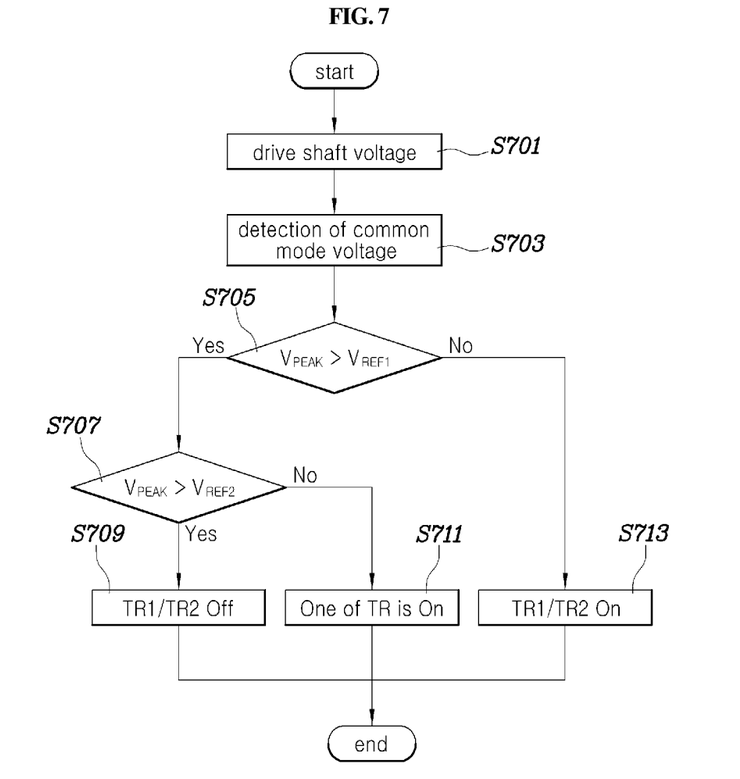
FIG. 7 is an exemplary flow chart illustrating a method configured to reduce a common mode voltage according to an exemplary embodiment of the present invention.
Figure 8A:
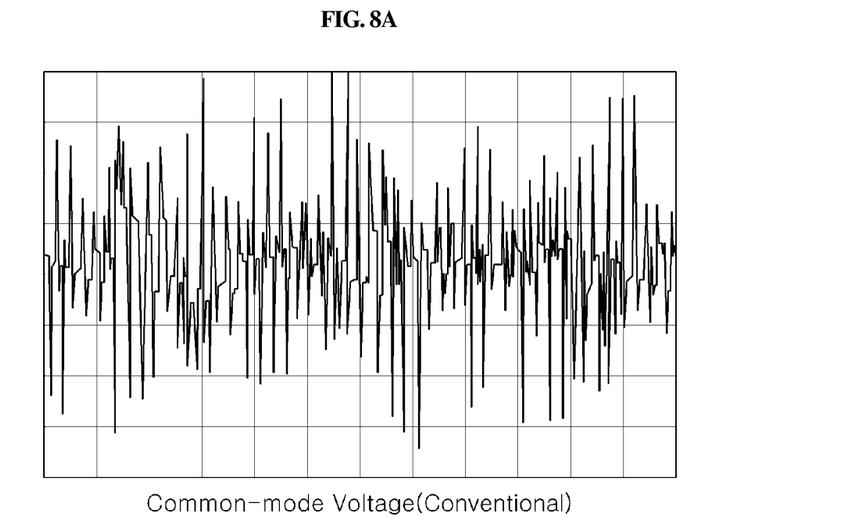
FIGS. 8A and 8B are common mode voltage spectra obtained using a conventional apparatus and method, and an apparatus and method according to an exemplary embodiment of the present invention, respectively.
Figure 8B:
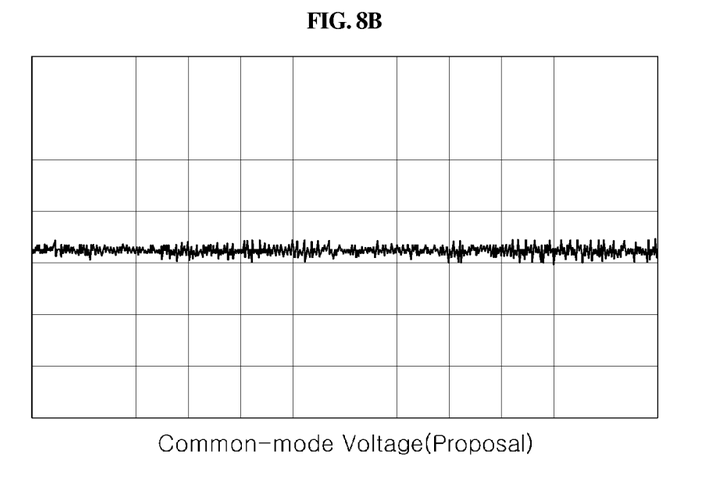

FIG. 7 is an exemplary flow chart illustrating a method configured to reduce a common mode voltage according to an exemplary embodiment of the present invention. FIGS. 8A and 8B are exemplary common mode voltage spectra obtained using a conventional apparatus and method, and an apparatus and method according to an exemplary embodiment of the present invention, respectively.

The method for reducing a common mode voltage according to an exemplary embodiment of the present invention may include: detecting, by a controller, a common mode voltage between a drive shaft and a drive motor frame (S703); comparing, by the controller, the detected common mode voltage with predetermined reference voltage (S705, S707); and adjusting, by the controller, a gate resistance of a power module connected to the drive motor, in response to the comparison of the detected common mode voltage and the predetermined reference voltages (S709, S711, S713). In addition, the method may further include detecting, by the controller, a high frequency component of the detected common mode voltage, and measuring a peak value of the detected high frequency component.

The comparison between the detected common mode voltage and the predetermined reference voltages may be performed by comparing the measured peak of the high frequency component with the predetermined reference voltage values. For example, first, the controller 60 may be configured to compare the measured peak voltage ($V_{PEAK}$) of the high frequency component with a first reference voltage ($V_{REF1}$) (S705). When the peak voltage is greater than the first reference voltage, the controller 60 may be configured to determine when the peak voltage is greater than the second reference voltage, which may be set to be greater than the first reference voltage (S707). When a peak voltage is less than the first reference voltage, the controller 60 may be configured to turn on both the switching elements 44 and 45 (S713) to decrease the resistance of the gate resistance unit 40 to a lowest degree.

Further, when the peak voltage is greater than the second reference voltage, the controller 60 may be configured to turn off both the switching elements 44 and 45 to increase the resistance of the gate resistance unit 40 to a greatest degree (S709). Furthermore, when the peak voltage is less than the second reference voltage, the controller 60 may be configured to turn on one of the switching elements 44 and 45 and turn off the other (S711). The magnitude of the resistances, which may be in a parallel connection, may be determined based to the ON/OFF states of the switching elements. In addition, the slope of the gate signal may be adjusted based on the magnitude of resistance of the gate resistance unit 40 to adjust oscillations at opposite ends of the power module 30, reducing the magnitude of common mode voltage as shown in FIG. 8B.

The method and apparatus according to one exemplary embodiment of the present invention may reduce a common mode voltage, which attenuates electromagnetic wave noise and decreases bearing abrasion. Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for reducing a common mode voltage, comprising:
   a drive motor;
   a gate resistance unit configured to provide resistance to a gate signal;
   a power module connected to and configured to drive the drive motor, wherein the gate signal is input to and drives the power module;
   a drive shaft connecting the drive motor to a plurality of wheels; and
   a controller configured to:
      detect a common mode voltage between the drive shaft and a frame of a drive motor, using a detecting unit;
      adjust a magnitude of resistance of the gate resistance unit, based on a magnitude of the detected common-mode voltage and a magnitude of a predetermined reference voltage,
      wherein a slope of the gate signal to time is determined by the magnitude of resistance of the gate resistance unit.

2. The apparatus of claim 1, wherein the detecting unit includes a contact unit in contact with the drive shaft.

3. The apparatus of claim 2, wherein the contact unit includes:
   a brush in direct contact with the drive shaft; and
   an elastic body configured to press the brush against the drive shaft.

4. The apparatus of claim 2, wherein the contact unit includes a thread-like conductor that surrounds the drive shaft.

5. The apparatus of claim 2, wherein the contact unit includes a ring-shaped conductor in contact with the drive shaft and is fixed within a housing.

6. The apparatus of claim 2, wherein the contact unit includes a pin-shaped conductor in contact with the drive shaft and is fixed within a housing.

7. The apparatus of claim 1, further comprising:
a filter configured to detect a high-frequency component of the common mode voltage detected by the detecting unit; and
a peak detecting unit configured to measure a peak value of the high-frequency component filtered in the filter and send the peak value to the controller.

8. The apparatus of claim 1, wherein the gate resistance unit includes:
a first resistance;
a plurality of second resistances; and
one or more switching elements, respectively connected to front ends of the second resistances,
where the controller is configured to adjust ON/OFF states of the switching elements.

9. The apparatus of claim 8, wherein the controller is further configured to:
compare the measured peak of the common mode voltage with a predetermined reference voltage; and
adjust ON/OFF states of the switching elements, based on the comparison of the measured peak of the common mode voltage with a predetermined reference voltage.

10. The apparatus of claim 8, wherein the controller is further configured to turn on at least one of the switching elements when the peak of the common mode voltage is greater than the predetermined reference voltage.

11. A method for reducing a common mode voltage, comprising:
detecting, by a controller, a common mode voltage between a drive shaft and a frame of a drive motor;
comparing, by the controller, the detected common mode voltage with a predetermined reference voltage; and
adjusting, by the controller, a resistance of a gate resistance unit of a power module in response to the comparison result,
wherein the gate resistance unit provides resistance to a gate signal input into the power module which is connected to and drives the drive motor, and
wherein the gate signal drives the power module and a slope of the gate signal to time is determined by the resistance of the gate resistance unit.

12. The method of claim 11, further comprising:
detecting, by the controller, a high frequency component of the detected common mode voltage;
measuring, by the controller, a peak value of the filtered high frequency component; and
comparing, by the controller, the measured peak of the high frequency component with the predetermined reference voltage value.

13. The method of claim 11, wherein the adjusting process, includes decreasing, by the controller, the gate resistance to a lowest degree when the detected common mode voltage is less than the reference voltage.

14. The method of claim 11, wherein the adjusting process, includes regulating, by the controller, at least one of the switching elements.

15. The method of claim 11, wherein the comparing process, includes:
comparing, by the controller, the detected common mode voltage with a predetermined first reference voltage; and
comparing, by the controller, the detected common mode voltage with a predetermined second reference voltage when the detected common mode voltage is greater than the first reference voltage.

16. The method of claim 15, wherein the adjusting process, includes increasing, by the controller, the gate resistance to a greatest degree when the detected common mode voltage is greater than the second reference voltage.

17. The method of claim 11, wherein the adjusting process, includes turning on, by the controller, at least one of the switching elements when the common mode voltage is less than the reference voltage.

18. The method of claim 15, wherein the adjusting process, includes turning off at least one of the switching elements when the common mode voltage is greater than the second reference voltage.

19. A non-transitory computer readable medium containing program instructions executed by a controller, the computer readable medium comprising:
program instructions that detect a common mode voltage between a drive shaft and a frame of a drive motor;
program instructions that compare the detected common mode voltage with a predetermined reference voltage; and
program instructions that adjust a resistance of a gate resistance unit of a power module in response to the comparison result,
wherein the gate resistance unit provides resistance to a gate signal input into the power module which is connected to and drives the drive motor, and
wherein the gate signal drives the power module and a slope of the gate signal to time is determined by the resistance of the gate resistance unit.

20. The non-transitory computer readable medium of claim 19, further comprising:
program instructions that detect a high frequency component of the detected common mode voltage;
program instructions that measure a peak value of the filtered high frequency component; and
program instructions that compare the measured peak of the high frequency component with the predetermined reference voltage value.

* * * * *